(12) United States Patent
Herb

(10) Patent No.: US 9,096,248 B2
(45) Date of Patent: Aug. 4, 2015

(54) PORTABLE LIFT DOLLY FOR INSTALLING, REMOVING, AND TRANSPORTING A TOILET

(71) Applicant: Donald Charles Herb, Banks, OR (US)

(72) Inventor: Donald Charles Herb, Banks, OR (US)

( * ) Notice: Subject to any disclaimer, the term of this patent is extended or adjusted under 35 U.S.C. 154(b) by 325 days.

(21) Appl. No.: 13/894,236

(22) Filed: May 14, 2013

(65) Prior Publication Data

US 2014/0339483 A1    Nov. 20, 2014

(51) Int. Cl.
| | |
|---|---|
| *B60P 1/64* | (2006.01) |
| *B66F 9/00* | (2006.01) |
| *B62B 3/02* | (2006.01) |
| *B62B 3/10* | (2006.01) |

(52) U.S. Cl.
CPC .... *B62B 3/02* (2013.01); *B62B 3/10* (2013.01)

(58) Field of Classification Search
USPC ............................ 254/2 C, 2 R, 7 R, 8 R, 134
See application file for complete search history.

(56) References Cited

U.S. PATENT DOCUMENTS

| | | | | |
|---|---|---|---|---|
| 4,722,511 | A  * | 2/1988  | Chitwood | ...................... 254/7 R |
| 5,373,593 | A  * | 12/1994 | Decky et al. | ....................... 4/661 |
| 6,135,466 | A    | 10/2000 | Irwin | |
| 6,752,379 | B1   | 6/2004  | Wall | |
| 7,798,469 | B2 * | 9/2010  | Junca | ............................ 254/9 B |
| 7,823,862 | B2 * | 11/2010 | Wakil | ............................ 254/8 R |

* cited by examiner

*Primary Examiner* — Lee D Wilson
*Assistant Examiner* — Shantese McDonald
(74) *Attorney, Agent, or Firm* — Robert Ireland; Ireland & Ireland P.C.

(57) ABSTRACT

A portable lift dolly for installing, removing, or transporting a toilet that includes a lifting frame having an end member with a projecting jack tab, two outer tubes vertically projecting from each side of the end member, at least two lifting arms extending away from the end member; two sets of adapter fingers, attaching at a distal end of each lifting aim by a pin, providing a pivot axis allowing rotation of the adapter fingers for setting the under tank; a base frame having an end portion, at least two stabilizing members extending away from the end portion, two inner tubes vertically projecting from the end portion; one jack having a base fixated to the end portion, an upper end contacting the jack tab, and an actuator for controlling the extension and contraction of the jack; having a plurality of wheels attaching to the base frame for maneuvering.

6 Claims, 5 Drawing Sheets

PORTABLE LIFT DOLLY FOR INSTALLING, REMOVING, AND TRANSPORTING A TOILET

BACKGROUND OF INVENTION

1. Field of the Invention

The present invention relates to a portable lift dolly constructed to vertically set down a toilet with accuracy during install, further arranged to vertically lift a toilet for removal, the apparatus configured with wheels providing ready toilet transport.

2. Description of the Related Art

During new construction and remodels of commercial or residential buildings, the install and/or removal of toilets provides several challenges. Toilets are heavy and bulky, making precision setting during install very difficult, as the installer must be bent over the toilet and 'feel' without a visual the wax ring seal. The most common wax seals involve a circular ring which is soft and easily damaged by even a slight toilet misalignment or off-level condition when set. A damaged wax ring can cause significant collateral damage besides the labor and expense of reinstalling a toilet and is preferably avoided. Removing a toilet can also be difficult as the laborer must lift the heavy toilet while being bent over and in most cases, within tight confines. Most often, setting a toilet involves two persons, one to set the toilet while the other aligns and ensures that the wax ring is not damaged during the set.

Removing an old toilet for replacement is accomplished by apparatus in the prior art several ways. For example, prior inventions, such as U.S. Pat. No. 6,135,466 to Irwin required a user to secure the toilet to arms extending from a hand truck configuration, wherein the toilet is tilted and lifted at the same time. Those tilt and lift devices similar to U.S. Pat. No. 6,135,466 require the toilet to be drained before lift and transport, which could prove problematic if the toilet removal was precipitated by a plugged pipe.

Other prior art examples of more sophisticated 'lift' removal devices include U.S. Pat. No. 7,823,862 to Wakil and U.S. Pat. No. 6,752,379 to Wall. Wakil teaches a lift device that incorporates the general structure of a hydraulic floor jack, with an extending member on each side of the toilet, two lower arms on each side of the toilet, with a 'U' shaped upper bar that compressively secures the toilet to the lift mechanism. The user actuates the hydraulic cylinder and the toilet is tilted per the arc of the lower anus as secured by the 'U' shaped bar, lifting and slightly tilting the toilet for transport. The Wakil lifting device does not provide a flat and level 'set' for install, and is used per the specification for removal only. Wall teaches a device capable of lifting a toilet for removal, and setting a toilet for install. However, Wall is complicated to operate, may be impossible to use if the toilet is located within tight confines, and requires the adjustment of a plurality of screw jacks, at least one on each side of the toilet making for difficult actuation.

There is a current need for a robust apparatus to solve the problem of lifting a toilet for removal and setting a toilet during install that does not involve heavy awkward lifting by the user, provides ready transport of the toilet, and is single user operational even in the tight confines in bathrooms or bathroom stalls where toilets are generally installed.

SUMMARY OF INVENTION

A first object of this invention is to provide a portable device that vertically sets down a toilet for install, controlled accurately by a single actuator performed by either an electric drill or manually thereby facilitating the setting down a toilet level while maintaining a parallel orientation to the floor, such that damage to the wax ring seal between the toilet and the plumbing collar is prevented, and aligning with mounting flange bolts is simplified.

A second object of this invention is to provide a portable device that can be used to quickly and easily lift a toilet for removal and transport, the lifting for removal performed by either use of an electric drill, pneumatic air pressure, hydraulic pressure, or manual turning or pumping of a single actuator.

A third object of this invention to provide a portable device for securely transporting a toilet level and parallel to the supporting surface.

A fourth object of this invention is to adapt the portable device to fit a variety of fancy shaped and varying sized toilets, such that the adaption is easily accomplished without tools or threaded fasteners through the use of flip out adaptor fingers that pivot about an axis such that some or all of the adapter fingers are rotationally turned until the size and shape of the toilet is fittingly contacted without marring or damaging the toilet.

It is yet a further object of this invention to provide a portable apparatus for transporting toilets that reduces the risk of the toilet falling off the transport apparatus.

It is still yet a further object of this invention to provide a portable apparatus for transporting toilets that does not require manual lifting efforts by the user.

It is another object of this invention to provide a portable apparatus for transporting toilets that can be operated easily by one person.

A further object of the invention is to provide an apparatus to lift and transport toilets which keeps the toilet in a level configuration such that any water in the toilet bowl and toilet tank is less likely to splash out during lifting, removal, and transportation.

Another object of this invention is to provide an apparatus for lifting and transporting a toilet which benefits from a protective coating over all contact surfaces with the toilet to eliminate damage to the toilet during transport, install, or removal.

These objects and further objects and features of the invention will be apparent to one skilled in the art from the disclosure of the present invention as set forth herein.

This invention involves a dolly apparatus for setting a toilet for install, lifting a toilet for removal, and transporting the toilet such that the toilet remains level to the floor. The lifting dolly apparatus includes a lifting frame, adaptor fingers, a base frame, one jack, and a plurality of caster wheels.

There has thus been outlined, rather broadly, the more important features of the invention in order that the detailed description thereof may be better understood, and in order that the present contribution to the art is significant and may be better appreciated. There are additional features of the invention that will be described hereinafter and which will form the subject matter of the claims appended hereto.

BRIEF DESCRIPTION OF THE DRAWINGS

The figures incorporated in and form a part of this specification, illustrate embodiments of the inventive apparatus to visibly show the principals of this invention.

DETAILED DESCRIPTION OF THE INVENTION

Figure 1:
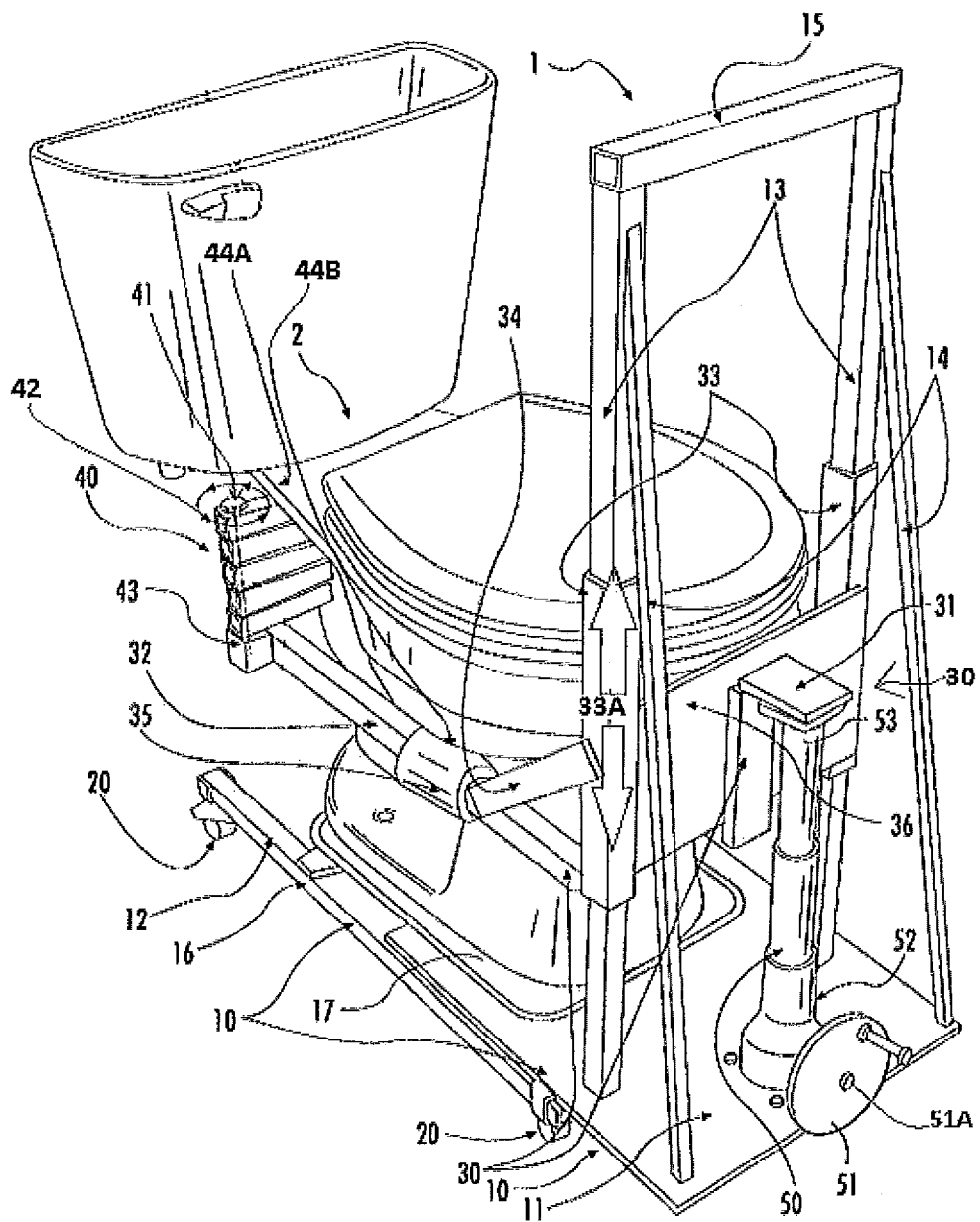
FIG. 1 shows a left perspective view of the preferred embodiment of the portable lift dolly for installing, removing, or transporting a toilet, having a toilet secured and suspended.

Referring now to the drawings, wherein similar parts are identified by like reference numerals, FIG. 1 shows a perspective view of the preferred embodiment of the portable lift dolly 1 securing a toilet 2 such that the toilet 2 remains level to the floor. The dolly apparatus 1 includes a lifting frame 30, adapter fingers 40, a base frame 10, one jack 50, and a plurality of caster wheels 20. The lifting frame 30 slidably engages a base frame 10 and is raised and lowered in relation to the base frame 10 by a single jack 50 located at an end portion 11 of the base frame 10.

The jack 50 is controlled by the manual actuator 51 or the electric drill chuck 51A allowing both slow manual raising and lowering and quick power assist raise and lowering.

The invention is quickly customized without tools and adjustable for the particular toilet 2 to be lifted, set, or transported. To adapt for and accommodate the many sizes and shapes of toilets 2, a plurality of adapter fingers 40 are pivotally connected at the distal end 43 of each lifting arm 32. As shown for particularly high tanked toilet 2 in FIG. 1, all of the adapter fingers 40 are rotated around the pivot axis 42 allowing adaption for the relatively tall toilet 2. For shorter toilets 2, less adapter fingers 40 are rotated underneath the under tank contact 44A making for a robust adjustable lift dolly capable of lifting, setting, and transporting most any type of toilets 2.

Each lifting arm 32 is complimented with a slidable arm pad 35 that works cooperatively with the adapter fingers 40 when lifting or suspending a toilet 2. Depending on shape and size of the toilet 2, the slidable arm pad 35 is moved along each lifting arm 32 until positive under bowl contact 44B is achieved. In practice, the user centers the toilet 2 within the lifting arms 32, raising the lifting arms 32 and moving the slidable arm pad 35 along each lifting arm 32 until under bowl contact 44B is positively made. Then the user rotates the adapter fingers 40 below the under tank contact 44A until positive under tank contact 44A is achieved making the toilet 2 ready for lifting. The same end can be achieved by setting the adapter fingers 40 first, and the slidable arm pad 35 second. The adapter fingers 40 and slidable arm pad 35 adjust in cooperation to achieve a best fit prior to lifting. The adapter fingers 40 and slidable arm pad 35 may be coated with non-marring materials such as vinyl or rubber, or constructed from plastics, wood, or other suitable mediums that provide positive contact without scratching or marring the toilet 2 surface.

Figure 2:
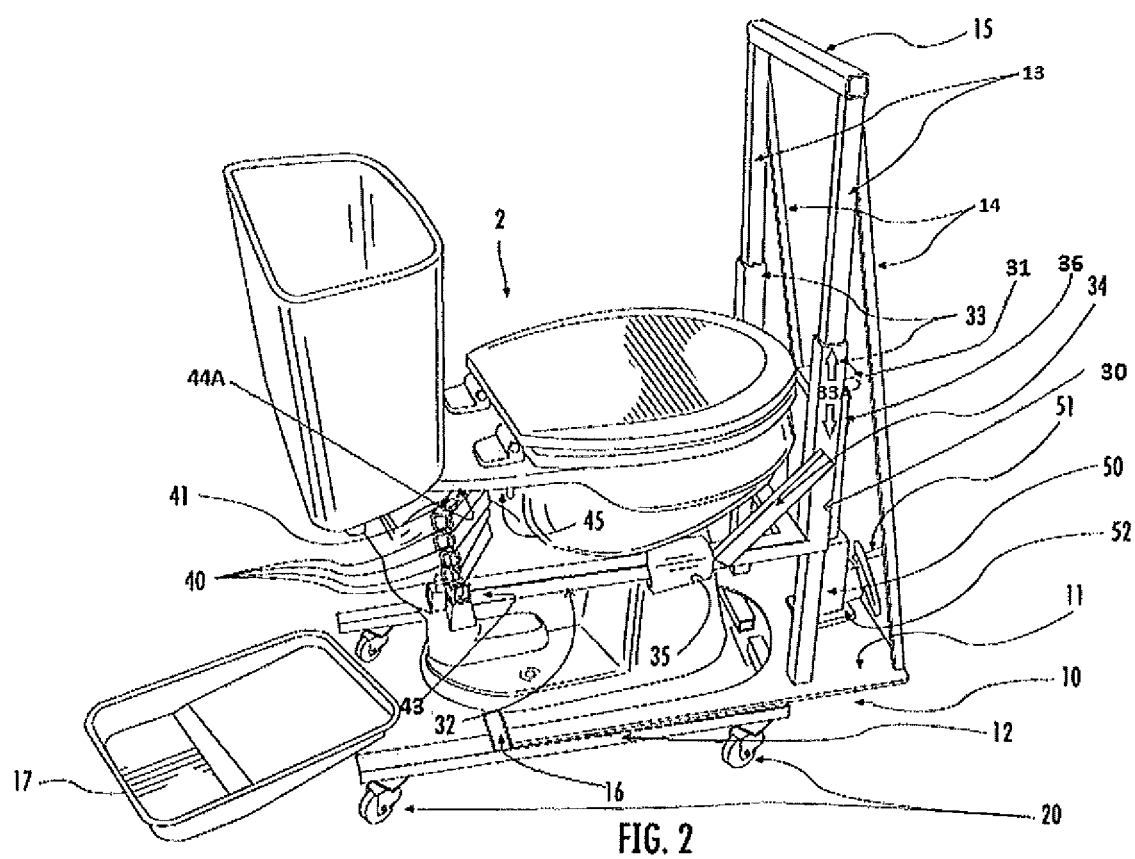
FIG. 2 shows a left side perspective view of the preferred embodiment, as depicted in FIG. 1.

As shown in FIG. 1-2, the lifting frame 30 has an end member 36 with a projecting jack tab 31, two outer tubes 33 vertically projecting from each side of the end member 36, at least two lifting arms 32 extending away from the end member 36, each lifting aim 32 having a slidable arm pad 35 for making under bowl contact 44B as described above. The slideable arm pad 35 is preferably constructed of a non-marring material, constructed and arranged to fit over the lifting arms 32, such that the arm pad 35 is easily slid into desired location, is resilient in compression such as high density foam or foam rubber, and under most all conditions be non-slip. At the distal end 43 of each lifting arm 32 a set of adapter fingers 40 attach by a pin 41. The pin 41 provides a pivot axis 42 (shown diagrammatically in FIG. 1) allowing rotation of the adapter fingers 40 for setting the under tank contact 44A.

The base frame 10 includes an end portion 11, at least two stabilizing members 12 extending away from the end portion 11, two inner tubes 13 vertically projecting from the end portion 11 insertably located within the two outer tubes 33 creating a slidable engagement 33A for the lifting and lowing of the lifting frame 30 in relation to the base frame 10, such that the lifting arms 32 remain parallel with the stabilizing members 12, To facilitate the lifting and lowering of the lifting frame 30, one jack 50 having a base 52 is fixated to the end portion 11 with an upper end 53 contacting the jack tab 31. The jack 50 is controlled by an actuator 51 for controlling the extension and contraction of the jack 50, which in turn controls the lifting and lowering of the lifting frame 30. The actuator 51 can be a handle for manual turning, or a fitting for attaching a cordless drill to speed up and make easier the lifting and lowering. A plurality of wheels 20 attaching to the base frame 10 for maneuvering, as shown caster wheels are used to provide directional positioning, but fixed axle wheels or skid plates work just as well depending on the supporting surface.

Figure 3:
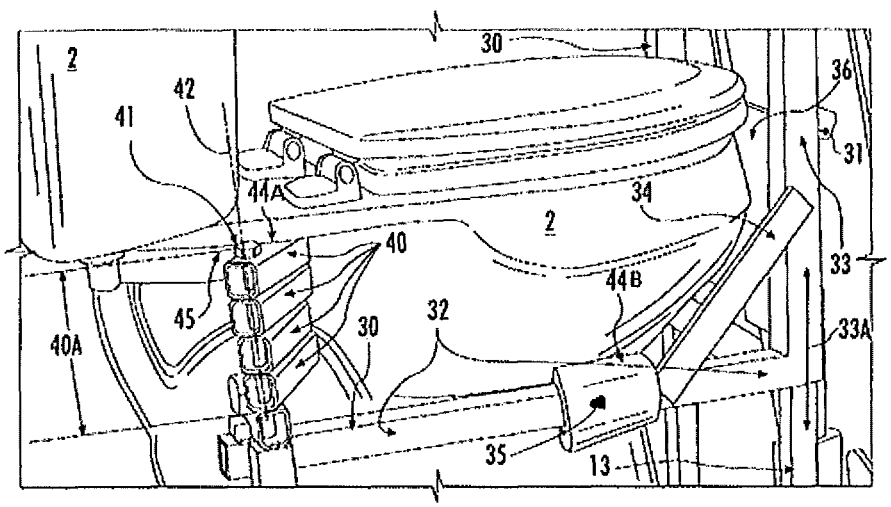
FIG. 3 shows a left side perspective close up view of the invention in FIG. 1.

As shown in FIGS. 1, 2, and 3, the lifting frame 30 secures the toilet 2 cooperatively with all of the adapter fingers 40 rotated under the under tank contact 44A, as attached to the distal end 43 of each lifting arm 32, while the slidable arm pad 32 is oriented at the under bowl contact 44B. The Slidable engaging 33A of the base frame 10 provides stable lifting and setting of the toilet 2. To increase strength and rigidity, the preferred embodiment includes a lifting arm brace 34 as fixated between each lifting arms 32 and each outer tube 33. The slidable engagement 33A between the lifting frame 30 and base frame 10 is provided by the two inner tubes 13 attaching to the end portion 11 of the base frame 10 fittingly inserting within the two outer tubes 33 of the lifting frame 30, such that the lifting frame 30 maintains a parallel orientation with the base frame 10 while the lifting frame 30 is slideably lifted and lowered as moved closer and further away from the base frame 10.

The base frame 10 is constructed and arranged to remain parallel with the supporting surface, usually a bathroom floor, held rigid by the two side stabilizers 12 as fixated to the end portion 11. In some embodiments at least one cross member 16 removably attaches between the two side stabilizers 12. Further stabilizing of the base frame 10 includes inner tube braces 14 attaching between each inner tube 13 and the end portion 11.

As shown in FIG. 2 for the preferred embodiment that utilizes a cross member 16, the cross member 16 is adjustable in location and easily removable prior to positioning the apparatus around an installed toilet 2. After the toilet is lifted, the cross member 16 is engaged to further secure the side stablizers 12 such that the base frame 10 benefits from increased rigidity during transport. During transport to capture any spills, a drip pan 17 is located over the cross member 16 centered between the two side stabilizers 12 directly under the toilet 2 outlet.

As shown in FIGS. 2 and 3, the plurality of adapter fingers 40 are rotationally pivoted about the pin's 41 pivot axis 42 until the toilet undersurface 45 is in mating contact with at least one adapter finger 40. Each model of toilet 2 has a slightly different shape and depth from the toilet under surface 45 to the floor, thereby requiring the lifting apparatus to be adjustable or adaptable for the various types of toilets 2. The inventive apparatus disclosed herein adapts and adjusts to varying toilet types without tools, threaded fasteners, or complicated hardware, as the adapter fingers 40 that are attached to each of the lifting arms 32, held rigid by the lifting arm brace 34, provide instant adaptation to varying toilet 2 sizes and shapes. The adapter fingers 40 may be of differing sizes and thicknesses allowing infinite adjustment potential. The adapter fingers 40 remain fixated to the apparatus making the apparatus readily capable of setting, removing, or transporting most any toilet 2 quickly and efficiently.

Figure 4:
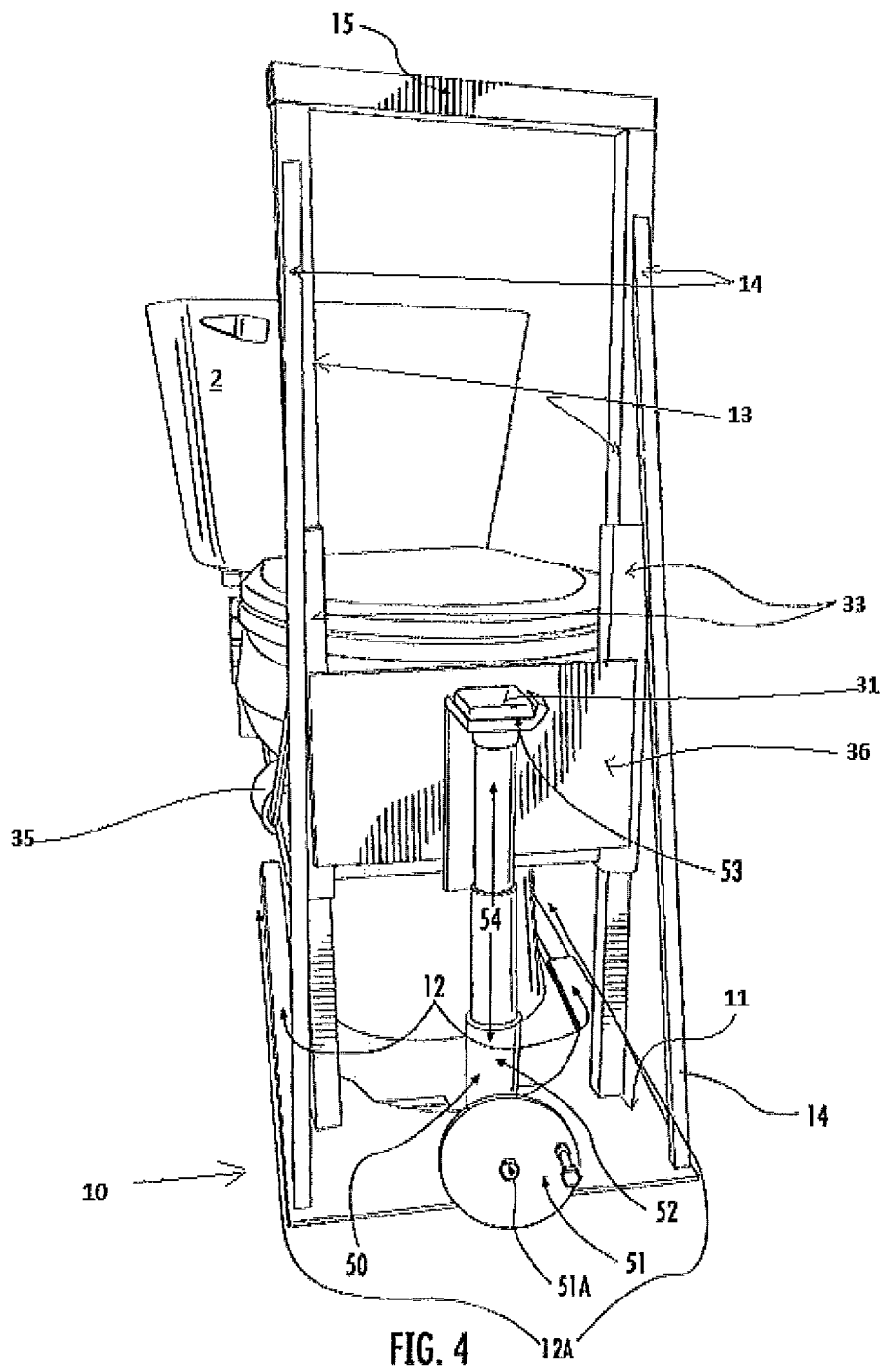
FIG. 4 shows an end perspective view of the preferred embodiment of FIG. 1.

As depicted in the previous figures, and shown from an end view in FIG. 4, the preferred embodiment facilitates the effective lifting of the toilet 2 by centering 12A the toilet 2 between the side stabilizers 12. The user controls the lift height 54 via the actuator 51 which manually adjusts the length of the jack 50, as attached to the base 52 and having an upper end 53 pushing up on the jack tab 31 that is attached to the lifting frame 30. As the jack 50 pushes up on the jack tab 31 the end member 36 raises with the lifting arms 32 which remain parallel with the side stabilizer members 12 (shown in FIG. 2), thereby lifting and maintaining the toilet 2 level to the floor, which is critical when setting down and installing a toilet 2 as described later in this disclosure. Rigidity of the base frame 10 is increased through the attachment of the handle 15 as fixated or welded between the inner tubes 13. To further increase rigidity of the base frame 10 one inner tube brace 14 is fixated or welded to each inner tube 13 above the location where the outer tubes 33 slidably engage, fixated or welded at the other end to the end portion 11 of the base frame 10.

To speed up or make easier the lifting and lowering of the toilet 2, an electric drill can be engaged to the actuator 51 via a chuck 51A that is positioned and arranged to be attached to a drill. The jack 50 may also be pneumatic as actuated with air, or hydraulic as actuated with pressured liquid.

Figure 5:
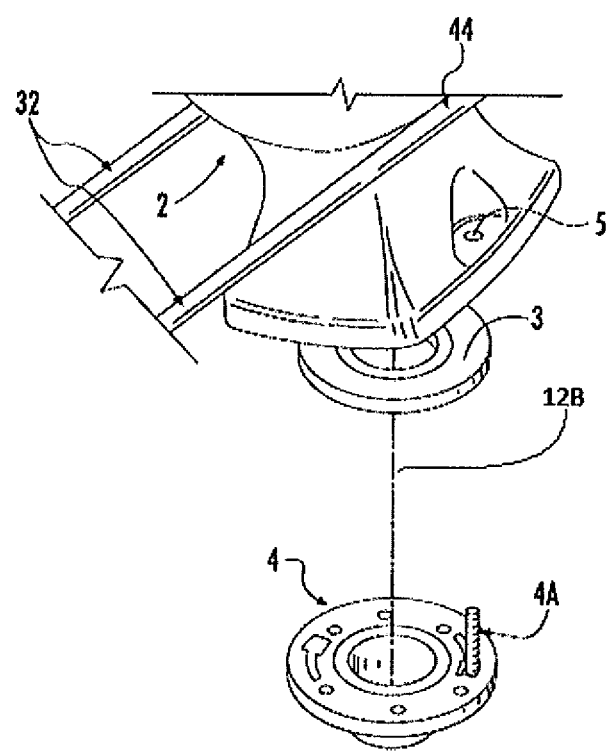
FIG. 5 shows a diagram of a toilet being suspended over the floor and ready for installation.

As shown in FIGS. 3, 4, and 5, and as discussed herein, to successfully install a toilet 2 without damaging the wax ring 3 the toilet 2 must be lowered level to the floor. Due to the circumstance that each toilet 2 to be installed may have different size and shape, the toilet lift dolly 1 must be adjusted for the particular toilet 2 prior to install. To adjust the toilet lift dolly 1 for installing, the toilet 2 to be installed is first centered between the side stabilizers 12 as described above. Then to adjust for level, the user slowly lengthens the jack 50 by manually operating the actuator 51 until the lifting arms 32 with arm pad 35 are close to providing contact with the toilet undersurface 45. As then positioned with the arm pads 35 close to contacting the undersurface 45, the adapter fingers 40 are rotated beneath the undersurface 45 until the fitting number 40A of adapter fingers 40 on each lifting arm 32 provide contact as between the adapter fingers 40 and the toilet undersurface 45. Once the adapter fingers 40 are positioned for lifting the particular toilet 2, the actuator 51 is operated to raise the lifting arms 32 until the arm pad 35 and adapter fingers 40 securingly pressures the toilet undersurface 45 such that four contact areas, both under tank contact 44A and both under bowl contact 44B balance and hold the toilet 2 parallel to the base frame 10 and level to the floor. If the toilet 2 when lifted is un-level to the floor, the actuator 51 is reversed, the toilet 2 lowered, and the above steps repeated until the toilet 2 is lifted and suspended level to the floor.

The contact areas under tank 44A include one at each adapter finger 40 set, and one under bowl 44B at each arm pad 35. As discussed herein, the adapter fingers 40 may be constructed from any suitable material, or combination of materials that provides rigid strength and a non-marring surface when contacting the toilet 2. Similar to a set of feeler gauges, the differing thickness of each adapter finger 40 as selected for rotation provides almost unlimited adjustment without having to use tools to make the alteration, Examples of adapter finger 40 embodiments include steel tubing of differing thicknesses coated with plastic coating for non-marring feature. Another example of adapter finger 40 construction options include polyethylene formed into elongated fingers, which proves both durable during use and non-marring to the toilet 2. Further advantage of the polyethylene material is the flex or bend that can assist accommodating fancy shaped toilets 2. Polyethylene is readily formable by injection molding or machining into different thicknesses and lengths for variably sized adapter fingers 40, providing an unlimited range of adaption. The arm pad 35 may be constructed of any suitable material, or combination of materials including but not limited to cloth, wood, or synthetic materials like polyethylene, rigid high density foam, plastics, or rubber coatings over metal tubing.

As shown in FIG. 4 and diagrammatically depicted in FIG. 5, to set a toilet 2 with the invention the toilet 2 is engaged much the same way as described above and shown in FIGS. 1-4 with the adapter fingers 40 being rotated until the fitting number 40A provides securing pressure to the undersurface 45 such that the toilet 2 is secured with four contact areas 44 when the lifting arms 32 are raised to engage the arm pads 35 with the toilet undersurface 45. The adaptor fingers 40 provide the leveling adjustment for the toilet 2 as held within the lifting arms 32 such that the toilet 2 is suspended level with the floor by the four contact areas 44 over the wax ring 3 and flange 4 prior to lowering.

As illustrated diagrammatically in FIG. 5, the toilet 2 is held suspended by the lifting arms 32 at the contact areas 44 level with the floor. Once the toilet 2 is centered and aligned 12B over the wax ring 3 and flange 4, the toilet 2 is ready to be lowered and installed. The actuator 51A as operated by an electric drill quickly lowers the toilet 2. Once close to the wax ring 3, the actuator 51 (shown in FIG. 4) is manually operated to slowly lower the toilet 2 in small easily controlled increments thereby avoiding damage to the wax ring 3. The wax ring 3 is often damaged by the toilet 2 during install when the toilet 2 is lowered down on the wax ring 3 crooked, misaligned, and not level to the flange 4. After the mount hole 5 is aligned with flange stud 4A and the toilet 2 is level and true above the wax ring 3, the final lowering by operating the actuator 51 (shown in FIG. 4) manually finishes the set of the toilet 2 thereby completing the most difficult task of the install.

The above summary with detailed description explains the advantages of the invention over the prior art and the various features of novelty which characterize the invention, which are described with specificity and particularity in the claims annexed to and forming a part of this disclosure.

| Reference Table | |
|---|---|
| NO. | ELEMENT |
| 1 | Vertical Lift and Set Toilet Dolly |
| 2 | Toilet (in hidden lines) |
| 3 | Wax Ring |
| 4 | Flange |
| 4A | Flange Stud |
| 5 | Mount Hole |
| 10 | Base Frame |
| 11 | End Portion |
| 12 | Side Stabilizer Members |
| 12A | Centering within Side Stabilizers |
| 12B | Aligning with Flange and Wax Ring |
| 13 | Inner Tube |

-continued

Reference Table

| NO. | ELEMENT |
|---|---|
| 14 | Inner Tube Brace |
| 15 | Handle |
| 16 | Cross member |
| 17 | Drip Pan |
| 12A | Centering Toilet Between Side Stabilizers |
| 20 | wheels |
| 30 | Lifting Frame |
| 31 | Jack Tab |
| 32 | Lifting Arm |
| 33 | Outer Tube |
| 33A | Slidable Engagement |
| 34 | Lifting Arm Brace |
| 35 | Arm Pad |
| 36 | End Member |
| 40 | Adapter Fingers |
| 41 | Pin |
| 42 | Pivot axis |
| 43 | Distal End |
| 44A | Under Tank Contact |
| 44B | Under Bowl Contact |
| 45 | Under Surface |
| 50 | Jack |
| 51 | Actuator |
| 51A | Chuck |
| 52 | Base |
| 53 | Upper End |
| 54 | Lift height |

What is claimed is:

1. A portable lift dolly for installing, removing, or transporting a toilet comprising:
   a) a lifting frame 30, the lifting frame 30 having an end member 36 with a projecting jack tab 31, two outer tubes 33 vertically projecting from each side of the end member 36, at least two lifting arms 32 extending away from the end member 36, each lifting arm 32 having an arm pad 35 for making under bowl contact 44B;
   b) two sets of adapter fingers 40, the adapter fingers 40 attaching at a distal end 43 of each lifting arm 32 by a pin 41, the pin 41 providing a pivot axis 42 allowing rotation of the adapter fingers 40 for setting the under tank contact 44A;
   c) a base frame 10, the base frame 10 having an end portion 11, at least two stabilizing members 12 extending away from the end portion 11, two inner tubes 13 vertically projecting from the end portion 11 insertably located within the two outer tubes 33 creating a slidable engagement 33A as between the lifting frame 30 and the base frame 10, such that the lifting arms 32 remain parallel with the stabilizing members 12;
   d) one jack 50, the jack 50 having a base 52 fixated to the end portion 11, an upper end 53 contacting the jack tab 31, and an actuator 51 for controlling the extension and contraction of the jack 50; and
   e) a plurality of wheels 20 attaching to the base frame 10 for maneuvering.

2. The portable lift dolly for installing, removing, or transporting a toilet of claim 1 wherein the arm pad 35 is slidable along the length of the lifting arm 32.

3. The portable lift dolly for installing, removing, or transporting a toilet of claim 1 wherein the adapter fingers 40 are of varying thicknesses.

4. The portable lift dolly for installing, removing, or transporting a toilet of claim 1 wherein the jack 50 is actuated by a power tool connected to a chuck 51A.

5. The portable lift dolly for installing, removing, or transporting a toilet of claim 1 wherein the wheels 20 include at least two caster wheels.

6. The folding lock back knife of claim 1, in which the pivot structure consists of a pivot screw and a pivot pin.

* * * * *